United States Patent [19]

Alneri et al.

[11] 3,912,778

[45] Oct. 14, 1975

[54] PROCESS FOR THE PREPARATION OF 3-KETO-GLUTARIC ACID BY CARBOXYLATION OF ACETONE IN GLIME

[75] Inventors: Enzo Alneri; Giorgio Bottaccio, both of Novara; Vittorio Carletti, Meda (Milan); Giulio Lana, Novara, all of Italy

[73] Assignee: Montedison S.p.A., Milan, Italy

[22] Filed: June 12, 1974

[21] Appl. No.: 478,724

[30] Foreign Application Priority Data

June 20, 1973 Italy.................................. 25640/73

[52] U.S. Cl......... 260/535 P; 260/465.4; 260/535 P; 260/595
[51] Int. Cl.²......................................... C07C 55/12
[58] Field of Search..................... 260/537 R, 535 P

[56] References Cited
UNITED STATES PATENTS
3,798,266   3/1974   Bottaccio et al. ............... 260/535 P FOREIGN PATENTS OR APPLICATIONS
277,486   9/1930   Italy.................................... 260/535

*Primary Examiner*—James A. Patten
*Assistant Examiner*—Paul J. Killos
*Attorney, Agent, or Firm*—Herbert L. Lerner

[57] ABSTRACT

Process for the preparation of an alkali metal salt of 3-keto-glutaric acid by carboxylation of acetone with an alkali metal phenate in the presence of a glime solvent-alkyl ethers of (poly)-ethylene-glycols. Phenol may be added and the reaction mass degassed of $CO_2$ by applying vacuum. Unreacted acetone and excess phenol may be removed from the reaction mass and recycled. Water may be added to the reaction mass to facilitate separation by filtration of solid alkali-metal-salt of 3-keto-glutaric acid in the reaction mass. The filtrate may be reconstituted by the addition of alkali metal hydroxide. Acidifying the alkali metal salt 3-keto-glutaric acid produces 3-keto-glutaric acid. The alkali metal salt of 3-keto-glutaric acid may be converted to citric acid by reaction with hydrogen cyanide. The citric acid separation may be facilitated with a calcium or barium salt.

8 Claims, No Drawings

PROCESS FOR THE PREPARATION OF 3-KETO-GLUTARIC ACID BY CARBOXYLATION OF ACETONE IN GLIME

The present invention relates to a process for the preparation of 3-keto-glutaric acid and more particularly this invention refers to a new and improved process for the preparation of 3-keto-glutaric acid by carboxylation of acetone in the presence of alkaline phenates carried out in glimes used as solvents. By the name "glime" is commonly meant the class of compounds comprising alkyl ethers of (poly)-ethyleneglycols, R–O$\left[\mathrm{CH_2 - CH_2 - O}\right]_n$ R wherein R = alkyl group. These alkyl ethers are known in the art and may be prepared in accordance with known methods, e.g., from sodium alcholate and dialkyl sulphate (Williamson reaction).

The 3-keto-glutaric acid, a known compound, represents a useful intermediate for chemical reaction in general, for example, as a base material for conversion into citric acid. Citric acid has numerous and important applications in industry: as a dispersing agent in the food industry, as mordant in the textile industry, in the field of alkydic resins, etc.

It is known that 3-keto-glutaric acid may be prepared by carboxylation of acetone in the presence of alkaline phenates, conducted in inert polar solvents such as alkyl-amides (dimethylformamide), alkyl-sulphoxides, and lactams.

Unfortunately, this process has several drawbacks, particularly with respect to separation and purification of the product, recycling of excess reactants and solvents, and conversion and recovery of by-products.

A conventional process for the preparation of 3-keto-glutaric acid to obtain citric acid is as follows:

The conventional process referred to comprises, in the first stage, the bicarboxylation reaction of the acetone with $CO_2$ in an aprotic inert dipolar medium, substantially anhydrous, chosen from amongst N-dialkyl-substituted amides of organic acids (in particular dimethylformamide), N-alkyl-lactams and dimethylsulphoxide, and in the presence of at least 4 moles of an alkaline phenate (Na, K) for one mole of acetone, at a temperature between 0°C and 60°C and under substantially atmospheric pressure.

During the carboxylation the alkaline phenate is converted into phenol, and one obtains thereby, the alkaline salt of 3-keto-glutaric acid, together with minor quantities of alkaline salts of acetacetic acid and of carbonates.

The alkaline salt of the 3-keto-glutaric acid may be isolated and used either as such or as an aqueous solution which by acidification may be converted into an aqueous solution of the free acid.

To effect separation of the alkaline salt of the 3-keto-glutaric acid from the reaction mass according to the known technique, at the end of the bicarboxylation reaction of the acetone, the reaction mass is leached with $H_2O$, thereby obtaining an aqueous solution of the alkaline salt of 3-keto-glutaric acid. Then the solvent (in general N,N-di-methylformamide) and the phenol are extracted and recycled separately. In fact, the phenol must be recycled as alkaline phenate and the addition of the necessary alkali cannot be carried out in the presence of the solvent which is destroyed by it. Separation and recovery of product, reactants and solvent are, as is evident, difficult and complicated. In addition, leaching of the reaction mass results in a dilute aqueous solution of alkaline 3-keto-glutarate. For conversion to citric acid, the aqueous solution of alkaline 3-keto-glutarate should be as concentrated as possible to improve yields.

The use of solvents, particularly dimethylformamide, most widely used in the carboxylation cycle, does not enable ready separation inasmuch as the alkaline salt of the 3-keto-glutaric acid is obtained in admixture with large quantities of $NaHCO_3$, which are difficult to separate. Subsequent leaching of the reaction mass with water, leads to a too dilute aqueous solution.

An object of the present invention is to provide an efficient, economical process for the preparation of 3keto-glutaric acid.

A further object to provide a method for separation of the alkaline salt of 3-keto-glutaric acid in the solid state from the reaction mass produced by carboxylation of acetone.

Another object is to provide a method for the recovery of reactants from the reaction mass produced by carboxylation of acetone.

A still further object is to provide a method for the preparation of citric acid.

Other objects and advantages of the present invention will be apparent from the following description.

In accordance with the present invention, an alkali metal, preferably sodium or potassium, salt of 3-keto-glutaric acid may be prepared by carboxylation of acetone with an alkali metal, preferably sodium or potassium, phenate in the presence of a solvent having the general formula:

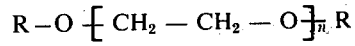

wherein R is a $C_1 - C_4$ alkyl group, preferably methyl, and wherein n is a whole number of 1–10, preferably 3 and 4. The solvent may be one or a mixture of glimes ( (poly) ethylene alkyl ethers) defined by the general formula. The alkyl groups on a glime may be the same or different, e.g., one R group may be methyl and the other R group may be butyl.

At the end of the bicarboxylation reaction, the reaction mass is degassed to free it of dissolved $CO_2$ and $CO_2$ complexed with the alkaline phenate by the application of vacuum and the addition of phenol, preferably in substantially stoichiometric amount with respect to the $CO_2$ complexed with the alkaline phenate.

The preferred solvent is tetraglime wherein R = methyl while $n = 4$.

The use of the glimes as solvents makes it possible to eliminate the $CO_2$ which binds as a complex with excess phenate during the carboxylation and which influences formation of $NaHCO_3$. In the prior processes the $NaHCO_3$ causes difficulty of separation, consumption of NaOH, and other problems. Applicants overcome these difficulties by the addition of phenol, preferably in stoichiometric amount with respect to the alkali (sodium) bound to the phenate. The $CO_2$ displaced from the complex with the phenate is then eliminated by degassing under vacuum from the reaction mass while the phenol may be distilled and recycled back for further degassing.

Simultaneously, and a surprising aspect of this invention, there occurs a decarboxylation of only the monocarboxylation product (acetacetic acid) substantially quantitatively as illustrated by the following reaction:

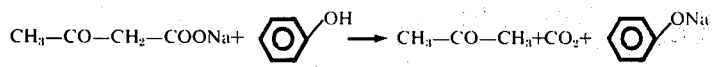

The bicarboxylation product (3-keto-glutaric acid) appears stable and does not decompose with the addition of phenol.

The dimethylformamide solvent, conventionally employed, is not suited for this operation both because of its limited chemical stability to alkali as well as for its volatility, and finally for the existence of an azeotropic mixture with the phenol which hinders the separation and recovery by distillation of the phenol and thus hinders its recycling to the degassing of the $CO_2$.

Unreacted acetone may be vaporized from the reaction mass contemporaneously with the degassing and the thus separated unreacted acetone recycled for further carboxylation.

Since the reaction medium of alkali phenate and solvent glime has lost alkali metal due to removal of salt of 3-keto-glutaric acid, metal may be replenished by introduction of alkali metal, e.g., NaOH, and the solvent glime which is not destroyed by it, together with the reconstituted alkaline phenate may be recycled for further carboxylation.

The separated alkali metal salt of 3-keto-glutaric acid may be converted to 3-keto-glutaric acid by acidifying with, for example, sulfuric acid and the 3-keto-glutaric acid separated from the aqueous sulfuric acid solution as by extraction with a suitable solvent, for instance, ether.

If citric acid is wanted, the aqueous solution obtained from the alkaline salt of the 3-keto-glutaric acid is converted in a second stage into the corresponding cyanhydrin by reaction with HCN in excess, preferably at a temperature comprised between 0°C and 10°C.

This is followed by hydrolysis of the cyanhydrin with excess $H_2SO_4$ and the citric acid thus obtained is then recovered by selective precipitation as an alkaline earth salt (Ca, Ba).

In a preferred embodiment, the process in accordance with the present invention is conducted as follows, when applied to a typical method for the preparation of 3-keto-glutaric acid by bicarboxylation of acetone with $CO_2$ in the presence of sodium phenate.

$CO_2$ is introduced into a reactor, fitted with a stirrer, thermometer, a metering device for the solid reactants and an inlet pipe for the $CO_2$, to exhaust the air therein. First, there is introduced sodium phenate dissolved in the glime (tetraglime) and then, keeping the temperature at about 25°C, acetone is introduced dropwise over a period of one hour, into an atmosphere of inflowing $CO_2$. The reaction is completed within about 2 hours. Thereupon, the dissolved $CO_2$ is degassed under a vacuum of 50 mmHg and phenol is admixed in a stoichiometric quantity with respect to the complex of the $CO_2$ with the sodium phenate. The complex within about two hours is for the most part decomposed. Contemporaneously, the unreacted acetone is distilled and recycled.

Thereupon, $H_2O$ is added which hydrolizes any residual complex to sodium bicarbonate and phenol, while facilitating the separation as a precipitate in a filterable form of the sodium salt of the 3-keto-glutaric acid, which latter may contain slight amounts of $NaHCO_3$.

The salt is then filtered and the filtrate, to which has been added a quantity of NaOh corresponding to the sodium that separated with the salt, is distilled in order to reconstitute the starting phenate. First, the $H_2O$ is separated with part of the phenol which may be recycled for hydrolysis of residual complex. The free phenol added in the degassing is separated and it may be cycled back to degassing. The residue will consist of sodium phenate in the glime (tetraglime) and both these substances are then recycled together to the carboxylation step.

3-keto-glutaric acid may be obtained from the sodium salt of the keto-acid by acidification, and extracted with ethyl ether or other suitable solvent.

In converting salt of 3-keto-glutaric acid to citric acid, the sodium salt is dissolved in a small amount of $H_2O$ and, to form a concentrated solution and, after cooling, cyanurated under stirring, thereby producing the corresponding cyanhydrin, which is then hydrolized with $H_2SO_4$ to citric acid.

After neutralizing the residual mineral acidity with $CaCO_3$, the mass is evaporated to dryness and then leached with a suitable solvent, for instance, with isopropyl-alcohol. The citric acid may be purified by simple crystallization to a high degree of purity.

The above described process is simple and efficient in operation. In fact, it permits one to obtain directly from the process an alkaline salt of 3-keto-glutaric acid sufficiently pure and usable without further treatment.

Thus, for instance, the salt may be transformed into citric acid with a selectiveness of the order to 95% with respect to that obtainable (about 75%) by operating the carboxylation in dimethylformamide, thanks to the high concentration of the starting aqueous solution to be cyanurated obtainable from the solid salt, and due to the substantial elimination of the impurity represented by the alkaline salt of the citramalic acid, derived from the acetoacetate which in the present process is decarboxylated to acetone in the degassing of $CO_2$ with phenol.

Further, the process of the present invention avoids the conversion to $NaHCO_3$ of practically the whole, up to 90%, of the excess of the alkaline phenate used in the carboxylation, which in the prior process occurs due to hydrolysis from leaching with $H_2O$. In fact, in the present process, the phenate is recovered and recycled as such together with the glime used, with the addition of only the NaOH for replenishing the Na subtracted from the system as a salt of the produced 3-keto-glutaric acid, with a considerable saving in alkali.

The invention will now be illustrated in more detail by the following examples which are given, however, without limiting the scope of the invention.

In the examples the salt of 3-keto-glutaric acid obtained according to the invention has been converted to citric acid, to better illustrate the preferred embodiment thereof.

EXAMPLE 1

Into a 5 necked flask of 500 cc capacity, fitted with stirrer, dipping thermometer, device for the feeding of solid reactants and inlet pipe for gases, after displacement of the air with fully dry $CO_2$, 45 g of sodium phenate in 140 cc of tetraglime were introduced, and thereupon, keeping the temperature at 25°C, during a period of one hour, 5.3 g of acetone were introduced dropwise. While maintaining a $CO_2$ atmosphere, the reaction was completed within another two hours. The physically dissolved $CO_2$ was then degassed under a residual vacuum of 50 mmHg whereafter there were added 60 g of phenol which, during further 2 hours under 50 mmHg, decomposed most of the sodium phenate complex $CO_2$ still present after carboxylation, and most of the sodium acetoacetate formed.

At this point 12 g of $H_2O$ were added which hydrolized the small quantity of unreacted complex to sodium bicarbonate and phenol favoring the precipitation of the sodium salts. By filtering and washing with 7 g of $H_2O$, there were obtained 9.1 g of 3-keto-glutarate together with 0.24 g of acetoacetate and 2.0 g of $NaHCO_3$ with a conversion yield of acetone equal to 55% and with a selectivity of 3-keto-glutarate of 96% with respect to the converted acetone. The washing waters were then recycled to the successive filtering operation. The filtrate, after addition of a quantity of NaOH corresponding to the Na contained in the salts, was subjected to distillation, removing in the given order the $H_2O$ coming from the washing of the cake of the salts and the $H_2O$ that formed in the salification of the phenol freed in the carboxylation, and finally the free phenol added in the degassing, which also is recycled to a successive operation.

The distillation residue consists of a solution of phenate in tetraglime ready for a new carboxylation.

From the raw sodium 3-keto-glutarate thus obtained, the acid was obtained by acidification with concentrated $H_2SO_4$ in excess, and by extraction with ethyl ether. Thereby were obtained 4.9 g of practically pure 3-keto-glutaric acid, with a yield, calculated on the converted acetone, equal to 67%.

Alternatively, if one wishes to obtain citric acid, the sodium salts obtained as such (raw 3-keto-glutarate) were dissolved in 14 g of $H_2O$, and, after cooling down to 0°–5°C, there were added 1.62 g of HCN.

After 2 hours of stirring, there were introduced 9.7 g of 94% $H_2SO_4$ equal to 10% in excess of the theoretically necessary quantity, and the mixture was refluxed for about four hours. At the end the mineral acidity still present was neutralized with $CaCO_3$; the mass was evaporated to dryness under vacuum at 80°C, and then the reaction mixture was repeatedly leached with a total of 150 cc isopropyl-alcohol. The residue, consisting of $CaSO_4$, $Na_2SO_4$ and $(NH_4)_2SO_4$, was eliminated, while the solution of citric acid with little citramalic acid was evaporated to dryness, thereby obtaining 9.1 g of raw citric acid free of inorganic ions. This citric acid, by a simple final crystallization from $H_2O$ was brought to the degree of purity required by the pharmacopeia.

From the crystallization there were obtained 8.27 g of pure citric acid, with a selectivity of 86% calculated with reference to the converted acetone. From the mother liquor then were recovered 0.83 of mixture of the citric/citramalic acids in a weight ratio of 2:1, corresponding to 9.5% with respect to the converted acetone.

EXAMPLE 2

Operating as in example 1 and using 5.3 g of acetone, 45 g of sodium phenate and 140 g of diglime, there was obtained a mixture of sodium salts containing 7.0 g of 3-keto-glutarate, 0.16 g of acetoacetate and 2.0 g of bicarbonate. This corresponds to a conversion of the acetone of 42% and to a selectivity of 97% calculated as in Example 1 (the remaining 3% being acetoacetate).

Operating as described in Example 1, from the raw sodium 3-keto-glutarate there were obtained 3.8 g of practically pure 3-keto-glutaric acid with a yield calculated on the converted acetone of 67%.

Alternatively, operating as described in Example 1, by the cyanuration of the raw sodium salt in an aqueous solution, saponification and separation and purification of the obtained citric acid, there were obtained 6.34 g of pure citric acid, with a selectivity of 86% calculated with respect to the converted acetone. From the mother liquor there were recovered 0.64 g of mixture of the citric/citramalic acids in a weight ratio of 2:1, corresponding to 10% with respect to the converted acetone.

We claim:

1. In a process for the preparation of alkali metal salt of 3-keto-glutaric acid by carboxylation of acetone in the presence of an alkali metal phenate, the improvement which comprises conducting said carboxylation in a solvent having the general formula:

$R-O+CH_2-CH_2-O+_n R$ wherein R is a $C_1-C_4$ alkyl; and wherein $n$ is an integer of 1–10.

2. Process according to claim 1, wherein R is methyl and n is 3 or 4.

3. Process according to claim 1, wherein said alkali metal is sodium or potassium.

4. Process according to claim 3, including, adding phenol to the reaction mass resulting from said carboxylation and applying vacuum to degas the reaction mass of $CO_2$.

5. Process according to claim 4 including vaporizing and recovering unreacted acetone from said reaction mass.

6. Process according to claim 4, including adding $H_2O$ to said reaction mass to facilitate separation of solid alkali metal salt to 3-keto glutaric acid in the reaction and separating said salt from the liquid portion of the reaction mass.

7. Process according to claim 6, including reconstituting said liquid portion by adding alkali metal hydroxide in an amount corresponding substantially to the alkali metal contained in said solid alkali metal salt, removing excess water and free phenol by distillation, leaving as distillation residue a solution consisting principally of alkali metal phenate in solvent for further carboxylation of acetone.

8. Process according to claim 6, including acidifying said separated alkali metal salt of 3-keto-glutaric acid and recovering 3-keto-glutaric acid.

* * * * *